Patented Apr. 3, 1923.

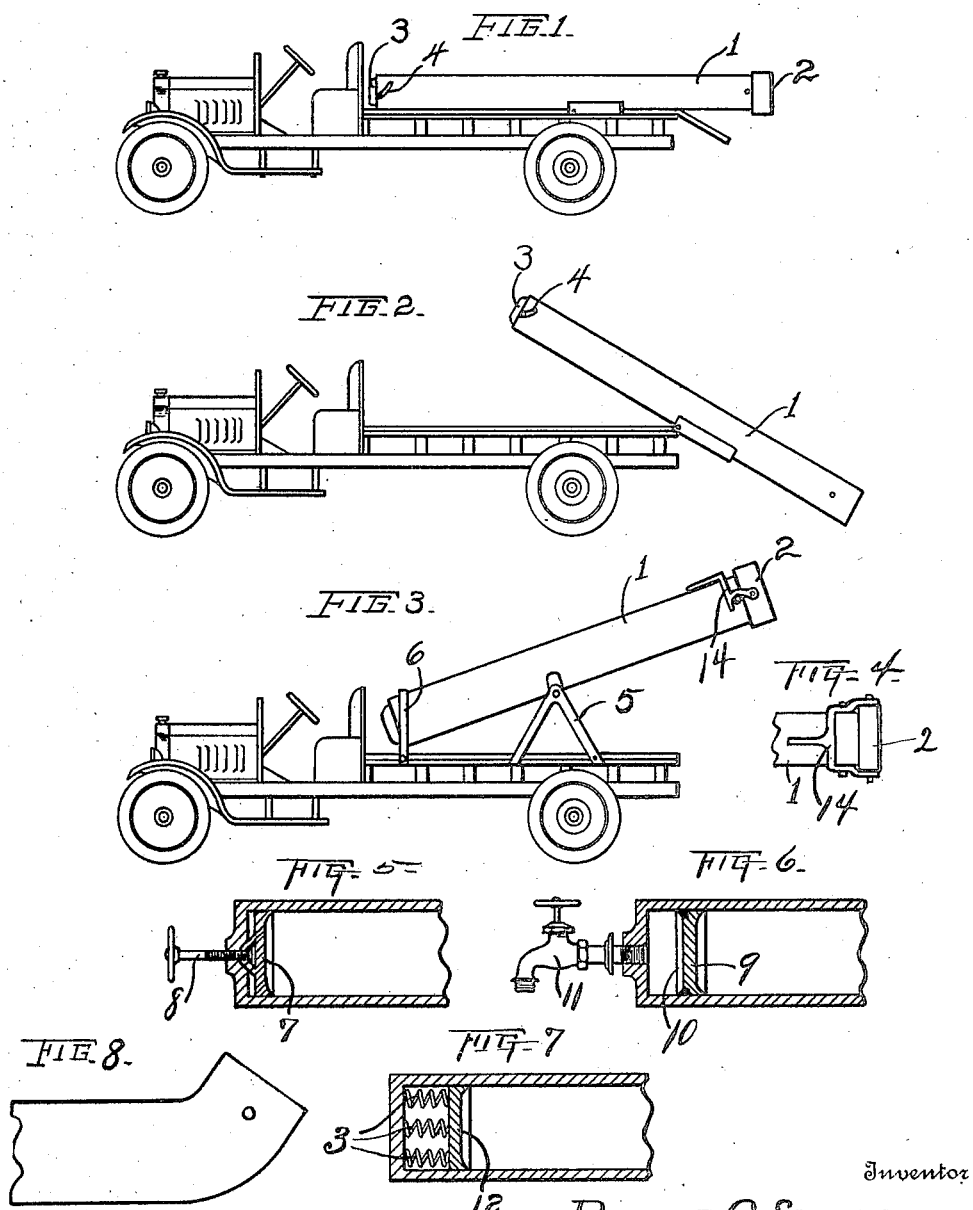

1,450,760

UNITED STATES PATENT OFFICE.

ROBERT C. STUBBS, OF DALLAS, TEXAS.

METHOD OF TRANSPORTING PLASTIC MATERIAL OR CONCRETE FOR PAVING AND OTHER PURPOSES.

Application filed October 17, 1921. Serial No. 508,117.

*To all whom it may concern:*

Be it known that I, ROBERT C. STUBBS, a citizen of the United States of America, residing at Dallas, in the county of Dallas and State of Texas, have invented certain new and useful Improvements in Methods of Transporting Plastic Material or Concrete for Paving and Other Purposes, of which the following is a specification.

My invention relates to the transportation of concrete or plastic material and particularly to a method of transporting material under pressure for placing the material for street or road or other paving; and the object is to provide a method of transporting such material without segregating the elements composing the plastic material. Owing to the building of national highways and other roads, there has arisen a problem of obtaining water at the place where the paving is to be laid and it has been found that the cost of obtaining a supply of water for such purposes costs about $1500 per mile. One of the objects of this invention is to eliminate to a great extent this increased expense. In transporting the mixed material in the plastic state ready for laying on the street or road in open trucks or carts, the ingredients become segregated by reason of the jolting of the truck or conveyor. The disadvantage or destructiveness caused by such segregation is that the aggregate or homogeneous mass becomes unbalanced by segregation into layers according to their specific gravity, the hydrating liquid, containing the highly calcined compounds of Portland cement being lighter, being forced to the top portion of the mass. Particles with greater specific gravity work towards the bottom. Such method of transportation materially deteriorates the efficiency of the product.

The advantage of my improved method is that it eliminates the segregation by overcoming gravity in the mass and maintains the mass in its original or intended composition, all particles retaining their relative positions to each other substantially as originally mixed in the container, thus retaining the binding properties of the highly calcined compounds throughout the mass.

Other objects and advantages will be fully explained in the following description and the invention will be more particularly pointed out in the claims.

Reference is had to the accompanying drawings which illustrate the improved process or method of transporting the material.

Fig. 1 is a side elevation of a truck carrying a container for the plastic material. Fig. 2 shows the same truck and container in position to dump the material. Fig. 3 is a side elevation of a truck carrying a container mounted at an incline and pivoted so that it can be elevated for dumping the material. Fig. 4 is a detail view of the means for closing the open end of the cylinder. Fig. 5 is a detail sectional view, showing a variation in the means for exerting pressure in the cylinder. Fig. 6 is a similar view to Fig. 5, showing a variation in the means for exerting pressure on the material in the cylinder. Fig. 7 is a similar view to Fig. 6, showing another variation in the pressure means. Fig. 8 illustrates a variation in discharge end of the cylinder.

Similar characters of reference are used to indicate the same parts throughout the several views.

The method of transporting concrete or plastic material herein set forth is for the purpose of greatly improving the facilities for placing concrete on country roads and the like. The assembling of materials along the roadway is very unsatisfactory, because it blocks the passage of other parts of the equipment, dirt becomes mixed with the aggregate, and the materials becoming mingled together in undesirable quantities. I have provided a method of transporting the mixed and wetted plastic material for distances of a mile or more in cylinders or drums carried on small motor trucks adapted for the service. In Figs. 1 and 2, I show a truck of ordinary construction for carrying a container or cylinder 1 which should be larger at the discharge end so that the material can be easily discharged. The cylinder or drum may be provided with a cap 2 which is removably secured thereto to be removed when the material is to be discharged. The other end of the cylinder is provided with a head 3 which can be forced into the cylinder in any suitable manner for packing the material closely in the cylinder. The head is provided with lugs which project radially therefrom and enter cam grooves 4 in the end of the cylinder. The cylinder may be slid along on the truck so that the discharge end can be inclined downwardly for dumping the plastic.

The cylinder 1 is differently mounted on the truck shown in Fig. 3. The cylinder is pivotally mounted on a bracket or support 5 and is inclined towards the front and held in the inclined position by a yoke 6 while being transported. When it reaches its destination, the yoke 6 may be swung off the cylinder so that the cylinder will automatically turn the discharge end downwardly for dumping the material. Or the yoke 6 might be removed before starting the transportation and the head 3 forced therein on the material to compress the same after the discharge end is turned downwardly. One advantage in transporting the material in a cylinder in the inclined position is that gravity will help hold the material against agitation caused by jolting of the truck. The material is closely packed in the cylinder by the required amount of pressure to overcome gravity, and the pressure is maintained on the material in the cylinder during the transportation and until the material is to be dumped at its permanent location. The shape of the container may be varied but the container must be so constructed that it can be sealed after the material is placed therein and means must be provided for packing the material in the container with the required amount of pressure and the pressure must be maintained on the material during transportation so that there can be no movement of the ingredients relative to each other during transit. In this manner the quality or efficiency of the plastic will be maintained and not be deteriorated during transit.

The variations shown for exerting pressure include a follower 7 which is cupped on the side next to the material and a screw shaft 8 having a swivel connection with the follower 7 for moving the follower. Another means shown includes a follower 9 provided with a rubber or other valve 10 and a compression bibb 11 for moving the follower 9 with compressed air. Another variation shows a follower 12 and springs 13 for maintaining the stress on the material. The springs will be compressed to some extent when the material is placed therein and the springs will aid in expelling the material. A cam lever 14 is shown for securing and moving the cap 2 on the open end of the cylinder. In this manner the plastic can be mixed at considerable distances from the final placing of the plastic. The advantage of such method of transportation, in addition to the preservation of the homogeneous mass with the binder properties intact, is that the plastic can be mixed at places convenient to water and ingredients which are to be used in making the plastic. The plastic will not be segregated during transit because the effect of jolting of the truck will be overcome by the pressure, the pressure overcoming the effect of gravity of the different ingredients.

The discharge end of the cylinder 1 may be constructed as shown in Fig. 8. This would make the filling of the cylinder more easily accomplished and also aid in spreading the concrete when being discharged.

What I claim, is,—

1. A method of transporting plastic material which consists in placing the material in a closed receptacle and sealing the material in the receptacle with pressure and maintaining pressure on the material in the sealed receptacle during transit whereby segregation of the particles of the material is prevented.

2. A method of transporting plastic material for paving and other purposes which consists in placing the prepared plastic in a container, sealing the container with pressure on the material maintaining pressure on the material during transit whereby agitation of the plastic and the movement of ingredients upon each other during transit are prevented.

3. In an operation of transporting plastic material; a method of maintaining the material intact during transit which comprises placing the material in a container, packing the material in the container and sealing the material in the container by pressure, and maintaining the pressure on the material during transit whereby the segregation of the ingredients is prevented and whereby the highly calcined compounds of Portland cement are maintained throughout the mass for binding purposes.

4. A method of transporting plastic material for paving and other purposes and of maintaining the binding qualities and the efficiency of the material during transit which consists in placing the prepared material in a container, packing and sealing the material in the container under pressure, transporting the material on a suitable truck, maintaining the pressure on the material during transit, and unsealing the container for dumping at the final location of the plastic material.

In testimony whereof, I set my hand, this 13 day of October, 1921.

ROBERT C. STUBBS.